(12) United States Patent
Kotecha et al.

(10) Patent No.: US 9,043,666 B2
(45) Date of Patent: May 26, 2015

(54) METHOD FOR EFFICIENT CONTROL SIGNALING OF TWO CODEWORD TO ONE CODEWORD TRANSMISSION

(71) Applicant: Apple Inc., Cupertino, CA (US)

(72) Inventors: Jayesh H. Kotecha, Austin, TX (US); Ian C. Wang, Austin, TX (US); Ning Chen, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/270,376

(22) Filed: May 6, 2014

(65) Prior Publication Data

US 2014/0245094 A1     Aug. 28, 2014

Related U.S. Application Data

(63) Continuation of application No. 13/584,686, filed on Aug. 13, 2012, now Pat. No. 8,719,654, which is a continuation of application No. 12/264,173, filed on Nov. 3, 2008, now Pat. No. 8,245,092.

(51) Int. Cl.
*H04L 1/18*     (2006.01)
*H04B 7/04*     (2006.01)

(52) U.S. Cl.
CPC ............ *H04B 7/0413* (2013.01); *H04L 1/1812* (2013.01); *H04L 1/1896* (2013.01)

(58) Field of Classification Search
CPC ........................... H04L 1/1809; H04L 1/1812
USPC ..................... 714/748, 749, 752, 776, 799
See application file for complete search history.

(56) References Cited

U.S. PATENT DOCUMENTS

| 6,435,737 | B1 * | 8/2002 | Wise et al. ................... 712/200 |
| 7,333,457 | B2 | 2/2008 | Gopalakrishnan et al. |
| 7,430,241 | B2 | 9/2008 | Vasudevan et al. |

(Continued)

FOREIGN PATENT DOCUMENTS

EP     1944896     7/2008

OTHER PUBLICATIONS

3GPP TS 36.212 v8.3.0 (May 2008) Technical Specification, 3rd, Generation Partnership Project; Technical Specification Group Radio Access Network; Evolved Universal Terrestrial Radio Access (E-UTRA); Multiplexing and channel coding, Release 8.

(Continued)

*Primary Examiner* — Fritz Alphonse
(74) *Attorney, Agent, or Firm* — Meyertons, Hood, Kivlin, Kowert & Goetzel, P.C.

(57) ABSTRACT

In a wireless communication system, a compact control signaling scheme is provided for signaling the selected retransmission mode and codeword identifier for a codeword retransmission when one of a plurality of codewords being transmitted over two codeword pipes to a receiver fails the transmission and when the base station/transmitter switches from a higher order channel rank to a lower order channel rank, either by including one or more additional signaling bits in the control signal to identify the retransmitted codeword, or by re-using existing control signal information in a way that can be recognized by the subscriber station/receiver to identify the retransmitted codeword. With the compact control signal, the receiver is able to determine which codeword is being retransmitted and to determine the corresponding time-frequency resource allocation for the retransmitted codeword.

16 Claims, 5 Drawing Sheets

(56) References Cited

U.S. PATENT DOCUMENTS

| | | | |
|---|---|---|---|
| 7,693,125 | B2 | 4/2010 | Ihm et al. |
| 7,990,911 | B2 | 8/2011 | Sutivong et al. |
| 8,086,927 | B2 * | 12/2011 | Hoshino et al. ............... 714/748 |
| 2004/0085924 | A1 | 5/2004 | Zhang et al. |
| 2005/0243793 | A1 | 11/2005 | Kim et al. |
| 2008/0175195 | A1 | 7/2008 | Cho et al. |

OTHER PUBLICATIONS

3GPP TS 36.213 v8.3.0 (May 2008) Technical Specification, 3rd Generation Partnership Project; Technical Specification Group Radio Access Network; Evolved Universal Terrestrial Radio Access (E-UTRA); Physical layer procedures, Release 8.

3GPP TSG-RAN Meeting #53bis, Warsaw, Poland, Jun. 30-Jul. 4, 2008, R1-08xxxx, Change Request.

3GPP TSG-RAN Meeting #53, Kansas City, MO, May 5-9, 2008, R1-082254, Change Request.

3GPP TSG-RAN Working Group 1 #53bis, Warsaw, Poland, Jun. 30-Jul. 4, 2008, R1-082311, Indication of codewords in dynamic switching from DCI format 1A to DCI format 2.

3GPP TSG-RAN WG 1 54bis, Prague, Czech Republic, Sep. 29-Oct. 3, 2008, R1-083520, Problems with DCI Format 1A and 2 for Retransmission.

* cited by examiner

US 9,043,666 B2

METHOD FOR EFFICIENT CONTROL SIGNALING OF TWO CODEWORD TO ONE CODEWORD TRANSMISSION

PRIORITY CLAIM

This application is a continuation of and claims the benefit of priority from U.S. patent application Ser. No. 13/584,686, entitled "Method for Efficient Control Signaling of Two Codeword to One Codeword Transmission" and filed on Aug. 13, 2012 (issuing as U.S. Pat. No. 8,719,654 on May 6, 2014), which is a continuation of and claims the benefit of priority from U.S. patent application Ser. No. 12/264,173, entitled "Method for Efficient Control Signaling of Two Codeword to One Codeword Transmission" and filed on Nov. 3, 2008 (issued as U.S. Pat. No. 8,245,092 on Aug. 14, 2012), both of which are fully incorporated herein by reference for all purposes and to the extent not inconsistent with this application.

BACKGROUND OF THE INVENTION

1. Field of the Invention

The present invention is directed in general to field of information processing. In one aspect, the present invention relates to a system and method for codeword retransmission.

2. Description of the Related Art

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed and/or adopted in several current emerging standards which use techniques, such as Multiple Input Multiple Output (MIMO), which is a transmission method involving multiple transmit antennas and multiple receive antennas.

An example of such a wireless system is the 3rd Generation Partnership Project (3GPP) Long Term Evolution (LTE) platform system 1 depicted in FIG. 1, which uses Orthogonal Frequency Division Multiplexing (OFDM) and multiple-input multiple-output (MIMO) antenna technology to implement the Evolved Universal Terrestrial Radio Access (E-UTRA) air interface. Generally speaking, the E-UTRA interface provides new functionalities or features for data channels (such as fast link adaptation, hybrid automatic repeat request, and simultaneous codeword transmission) that rely on rapid adaptation to changing radio conditions. As depicted, the infrastructure includes one or more transceiver devices 2, 4, 6, 8 which each include transmit and receive circuitry that is used to communicate wirelessly with any mobile end user(s) 10-15 located in each transceiver device's respective cell region. Thus, transceiver device 2 includes a cell region 3 having one or more sectors in which one or more mobile end users 13, 14 are located. Similarly, transceiver device 4 includes a cell region 5 having one or more sectors in which one or more mobile end users 15 are located, transceiver device 6 includes a cell region 7 having one or more sectors in which one or more mobile end users 10, 11 are located, and transceiver device 8 includes a cell region 9 having one or more sectors in which one or more mobile end users 12 are located. In the LTE architecture, the transceiver devices 2, 4, 6, 8 may be implemented with base transceiver stations (referred to as enhanced Node-B or eNB devices) which in turn are coupled to Radio Network Controllers or access gateway (AGW) devices 22, 24 which make up the UMTS radio access network (collectively referred to as the UMTS Terrestrial Radio Access Network (UTRAN)). Through the access gateway devices 22, 24, the eNBs 2, 4, 6, 8 are coupled to an EPC 26 (Evolved Packet Core) and switching center 28 of some form and from there to other public switched networks, e.g., public switched telephone network, Internet, or other packet and possibly circuit switched networks. As will be appreciated, each transceiver device (e.g., eNB 2) in the wireless communication system 1 includes a transmit/receive antenna array and communicates with receiver device (e.g., user equipment 15) having a receive antenna array, where each antenna array includes one or more antennas. The wireless communication system 1 may be any type of wireless communication system, including but not limited to a MIMO system, SDMA system, CDMA system, SC-FDMA system, OFDMA system, OFDM system, etc. Of course, the receiver/subscriber stations (e.g., UE 15) can also transmit signals which are received by the transmitter/base station (e.g., eNB 2). The signals communicated between transmitter/base station(s) and receiver/subscriber station(s) can include voice, data, electronic mail, video, and other data, voice, and video signals.

To provide high rate packet data services over the E-UTRA air interface, each transmitter/base station (e.g., eNB 2) may include a scheduler or resource scheduler functionality for allocating resource blocks to users which are currently connected to the access network. The resource scheduling data and control signaling, along with other control information (e.g., power level, channelization codes, etc.), must be conveyed to each receiver device (e.g., UE 15) over a downlink channel so that the receiver device will know how to transmit data on the uplink. While the downlink signaling may be done in any desired way, the E-UTRA air interface at 3GPP TS 36.213 (V8.3.0) specifies physical downlink shared channel related procedures for transmitting downlink data and control information from the transmitter/base station (e.g., eNB 2) to the receiver/subscriber stations (e.g., UE 15). In particular, the transmission mode and downlink control information (DCI) is defined so that each receiver/subscriber station (e.g., UE 15) receives a Physical Downlink Control Channel (PDCCH) and a Physical Downlink Shared Channel (PDSCH) data transmission associated with predetermined DCI format signaled by the associated PDCCH. Thus, a receiver/subscriber station (e.g., UE 15) may be semi-statically configured via higher layer signaling to receive PDSCH data transmissions in a particular transmission mode associated with a reference DCI format signaled by a PDCCH in its UE-specific search spaces based on the following table:

TABLE 1

Reference DCI Format(s) Supported By Each Transmission Mode

| Transmission Mode | Reference DCI Format |
| --- | --- |
| 1. Single-antenna port; port 0 | 1, 1A |
| 2. Transmit diversity | 1, 1A |
| 3. Open-loop spatial multiplexing | 2 |
| 4. Closed-loop spatial multiplexing | 2 |
| 5. Multi-user MIMO | 1D |
| 6. Closed-loop Rank = 1 precoding | 1B |
| 7. Single-antenna port; port 5 | 1, 1A |

In accordance with Table 1, the transmitter/base station (e.g., eNB 2) can transmit a PDCCH to signal the receiver/subscriber stations (e.g., UE 15) that PDSCH data transmissions associated with DCI format 1A will be transmitted using a transmit diversity mechanism which supports sending a single transport block or codeword (CW) in a subframe. But if the channel conditions change, the transmitter/base station can dynamically switch from one format (e.g., DCI format 1) to another (e.g., DCI format 2), or vice versa. For example, if radio conditions improve, the transmitter/base station (e.g., eNB 2) can transmit a PDCCH to signal the receiver/subscriber stations (e.g., UE 15) that PDSCH data transmissions associated with DCI format 2 will be transmitted using spatial multiplexing which supports the transmission of two transmission blocks or codewords (CW) in one subframe of a MIMO transmission.

One drawback associated with dynamically switching between transmission formats is the difficulty of identifying a transport block/codeword that is being re-transmitted in accordance with an error control protocol, particularly when only a single transport block/codeword can be re-transmitted to due changed channel conditions. For example, the current LTE standard provides a hybrid ARQ (HARQ) process in which retransmissions of the same transport block/codeword can be requested by the receiver/subscriber station (e.g., UE 15) by reporting a Negative Acknowledgement (NACK) in case a transport block/codeword is received in error in the first transmission. If the receiver/subscriber station reports NACK on a single codeword transmission that is transmitted using DCI format 1A, then it is a simple matter of retransmitting the codeword again using the same DCI format. But for the MIMO case in which two transmitted transport blocks/codewords are received in error and the transmitter/base station/eNB switches from DCI format 2 to DCI format 1A prior to retransmission, then only a single transport block/codeword can be transmitted at a time using DCI format 1A. Unfortunately, there is no mechanism provided in the DCI format 1A for identifying which of the two transport blocks/codewords is being transmitted. For example, the DCI format 1A has only a three-bit HARQ field, so it is not possible to use the HARQ field to identify both the full range of HARQ process ID values and the codeword number. While there have been proposals to signal which of the two transport blocks are being retransmitted by providing a mechanism in which the transport block identifier is signaled using two masks to scramble the CRC of the DCI payload bits in addition to the user id mask, this mechanism is undesirable since it reduces the number of user ids available for scheduling.

Accordingly, there is a need for an improved system and methodology for signal processing and control signaling in a MIMO system which overcomes the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

DETAILED DESCRIPTION

Figure 1:
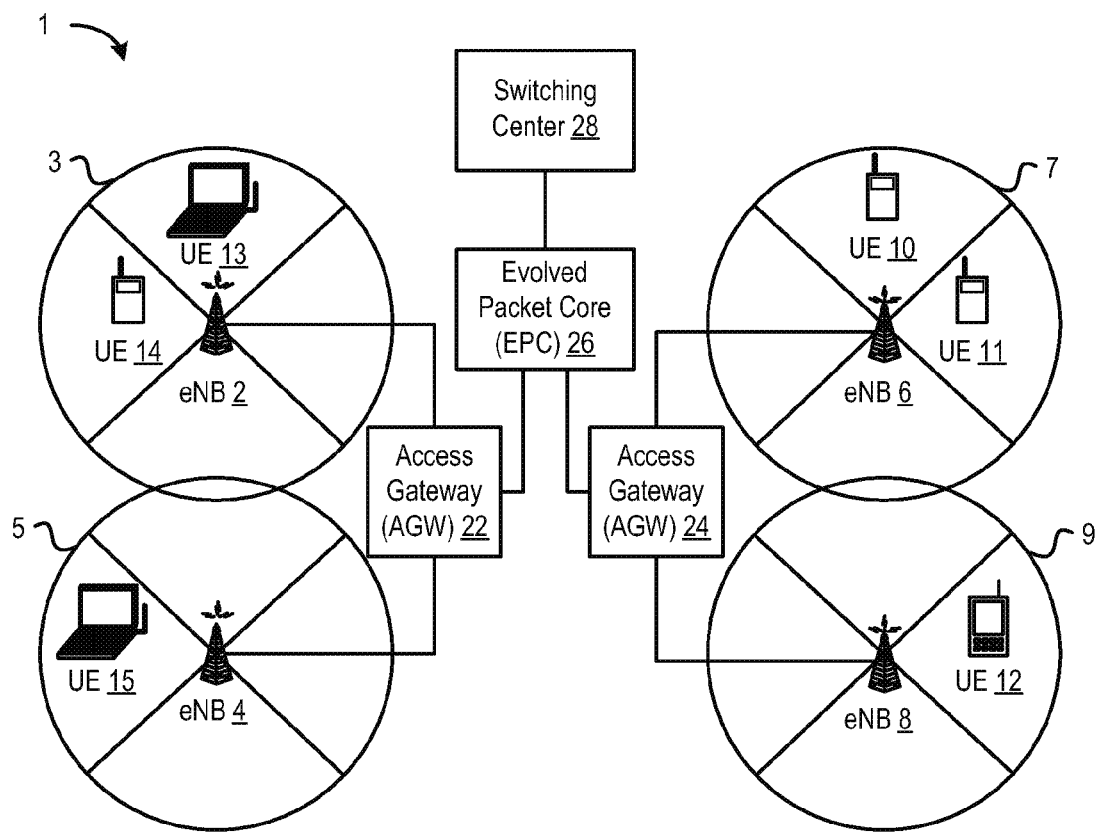
FIG. 1 schematically illustrates the architecture of an LTE wireless communication system.

A codeword transmission system and methodology are described for use in efficiently retransmitting codewords when the wireless communication system switches from a higher order channel rank (e.g., DCI format 2 or 2A) to a lower order channel rank (e.g., DCI format 1A) by providing a downlink control signal with a resource allocation field that can be redefined to include any desired control information (including, but not limited to an identifier for the retransmitted codeword) when the retransmission status for the codeword allows selected resource allocation information to be inferred at the receiver. An example application is when codebook-based precoding techniques are used to enable spatial multiplexing of one or more codewords or transport blocks for simultaneous transmission over one or more layers using a predetermined codeword-to-mapping structure, such as specified by the 3GPP LTE specification TS 36.211 entitled "Physical Channels and Modulation." In instances where there is a transmission failure when transmitting one or more codewords over two codeword pipes and the transmitter/base station switches from DCI format 2 to DCI format 1A, codeword retransmission over a single codeword pipe is enabled by generating and transmitting a re-transmit control signal which includes a codeword identifier at the transmitter/base station, and then retransmitting the failed codeword(s) over the codeword pipe so that the receiver/subscriber station can determine the time-frequency resource allocation for the identified codeword. In selected embodiments, the codeword identifier is provided as an additional bit in the control signaling, such as by adding a codeword identifier bit to the PDCCH in all DCI formats, though this approach can increase the signaling overhead required for the larger control signal. In other embodiments, the codeword identifier is provided without requiring additional control signal bits by squeezing at least one bit from the resource allocation field of a lower order channel rank PDCCH (e.g., DCI format 1A) to provide a codeword identifier bit. The control signal bit(s) may be squeezed from the resource allocation field by exploiting the fact that other control signal fields (e.g., HARQ process id bits, new data indicator (NDI) bit, and/or modulation and coding scheme (MCS) index values 29-31) can be used at the receiver/subscriber station to detect that this is a codeword retransmission, meaning that the transport block size (TBS) of this grant remains the same as that of the previous grant for that codeword. With this knowledge, the receiver/subscriber station can then use the codeword identifier bit to choose from the TBS values that were obtained and stored from the previous control signal for the original transmission. Thus, instead of using the resource allocation field (e.g., the resource indication value (RIV) in the resource allocation field of a PDCCH with DCI format 1A) to convey the TBS value (or data for deriving same) again for the retransmitted codeword, the codeword identifier bit is used to identify which stored TBS value corresponds to the retransmitted codeword. Where the retrieved TBS value has a plurality of time-frequency resource allocations associated with the TBS value, the remainder of the resource allocation field (or at least a part thereof) may include one or more selection bits for use by the receiver/subscriber station in picking from the plurality of time-frequency resource allocations, thereby choosing a time-frequency resource allocation for use in receiving the retransmitted codeword. In this way, one or more codewords that are originally transmitted using higher order transmission rank (e.g., rank 2, rank 3 or rank 4) may be retransmitted with a lower rank (e.g., rank 1) by using a compact control signaling mechanism to convey a codeword identifier for each retransmitted codeword without displacing or consuming other control signal information, such the TBS bits, the starting resource block ($RB_{start}$), the user ids, or the HARQ process ID bits. As described herein, a compact control signaling scheme is provided for signaling the selected retransmission mode and codeword identifier for a codeword retransmission when the base station/transmitter switches from a higher order channel rank to a lower order channel rank, either by including one or more additional signaling bits in the control signal to identify the retransmitted codeword, or by re-using existing control signal information in a way that can be recognized by the subscriber station/receiver to identify the retransmitted codeword. With the compact control signal, the subscriber station/receiver is able to determine which codeword is being retransmitted and to determine the corresponding time-frequency resource allocation for the retransmitted codeword.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 2:
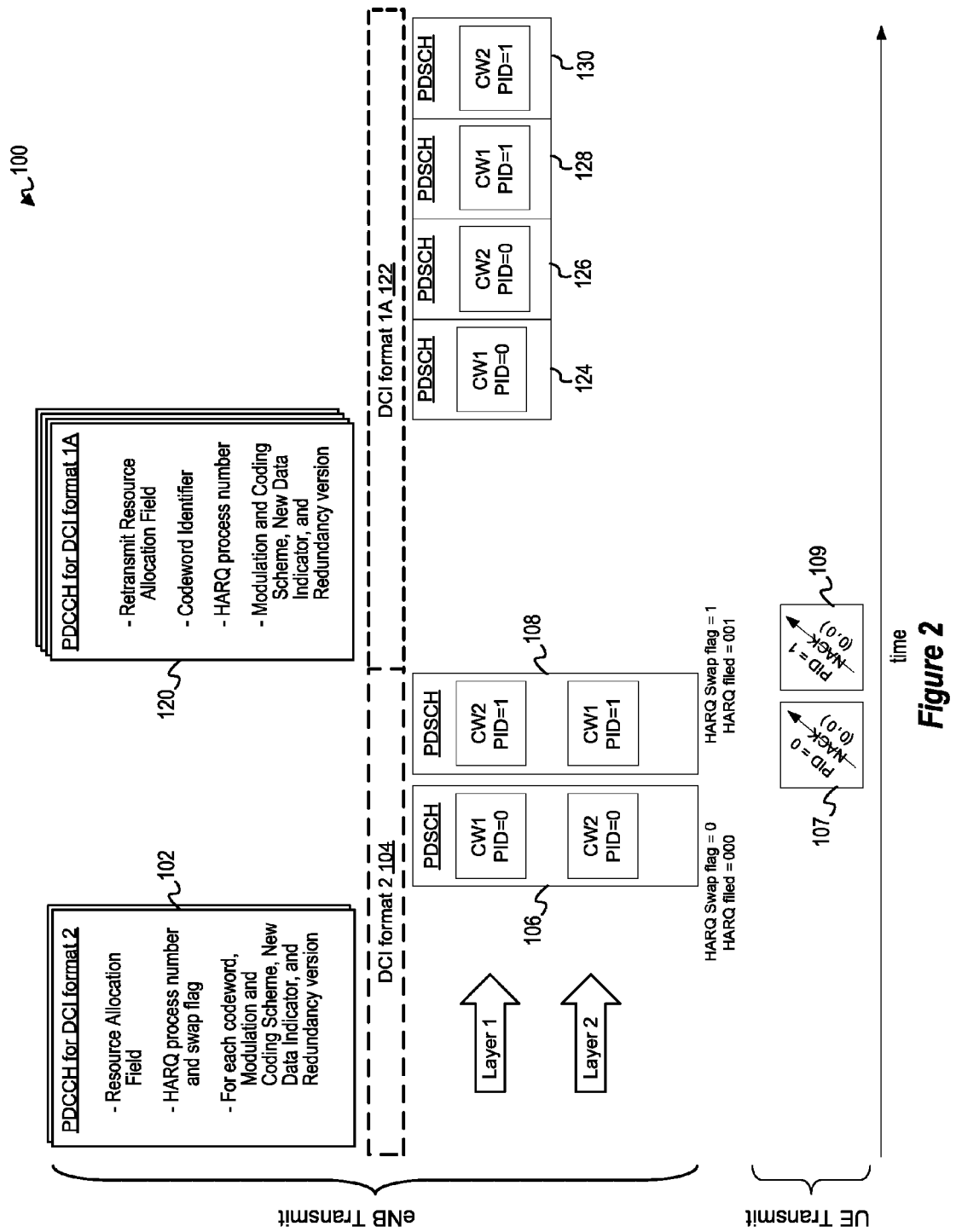
FIG. 2 schematically illustrates the retransmission of codewords by a transmitter which dynamically switches between DCI format 2 and DCI format 1A.

Turning now to FIG. 2, there is schematically illustrated the retransmission of codewords (CW1, CW2) by a transmitter/eNB which dynamically switches between DCI format 2 104 and DCI format 1A 122 in accordance with the 3GPP LTE system specification description of the transmission mode and DCI (downlink control information) provided at R1-082254, "TS36.213 CR 19 Rev1 v8.2.0" (May 2008). As illustrated, the transmitter/eNB is able to support the transmission of two codewords (CW1, CW2) in one subframe by using DCI format 2 104. To this end, the transmitter/eNB generates a physical downlink control channel (PDCCH) control signal 102 as a shared physical signaling channel to convey control information for multiple users and to set up the physical downlink shared channel (PDSCH) data transmission (e.g., 106) which carries high-speed data to users. To convey control information for the PDSCH 106 being transmitted with DCI format 2, the PDCCH control signal 102 may include at least a resource allocation field (e.g., a resource allocation header and a resource block assignment), a HARQ process number and swap flag, and, for each codeword, modulation and coding scheme (MCS) bits, a new data indicator (NDI) bit, and a redundancy version bits. Of course, the PDCCH control signal 102 may include other control signal information, such as specified in the 3GPP LTE technical specification TS 36.212 entitled "Multiplexing and Channel Coding."

After conveying the control signal information with the PDCCH control signal 102, the transmitter/eNB sends a PDSCH data transmission 106 which spatially multiplexes the two codewords (CW1, CW2) onto two layers (Layer 1, Layer 2) using DCI format 2, where both of the codewords CW1, CW2 have an associated 3-bit HARQ process ID (PID) in DCI format 2 for Frequency Division Duplexing (FDD) of PID=0. If there is a transmission failure of the codewords CW1, CW2 in the first PDSCH data transmission 106, the UE feeds back a NACK signal 107 to initiate a HARQ retransmission process. In response, the transmitter/eNB can retransmit the spatially multiplexed codewords (CW1, CW2) in the second PDSCH data transmission 108 in DCI format 2, along with their respectively associated 3-bit HARQ process ID (PID) in DCI format 2 for Frequency Division Duplexing (FDD) of PID=1, provided that the transmitter/eNB is still using the higher order channel rank 104 (e.g., DCI format 2). However, if the second PDSCH data transmission 108 also fails, the NACK signal 109 is reported by the UE.

At this point in the timeline shown in FIG. 2, the transmitter/eNB switches from format 2 104 to format 1A 122, meaning that only a single codeword can be (re)transmitted during a subframe. However, in the currently defined processing structure for the format 1A PDCCH downlink control information specified in the 3GPP LTE technical specification TS 36.212 v8.3.0 entitled "Multiplexing and Channel Coding" (May 2008), there is no provision for including a codeword identifier in one of the control signal fields. For example, current format 1A only has a three bit HARQ field, and is therefore incapable of identifying both the HARQ process ID and a codeword identifier in the scenario described in FIG. 2. To address this deficiency, selected embodiments of the present invention provide one or more PDCCH control signals 120 which convey control information for the PDSCH data transmission(s) 124-128 being re-transmitted with DCI format 1A and which include at least one codeword identifier bit. As shown in FIG. 2, the PDCCH control signal 120 includes at least a retransmit resource allocation field, a codeword identifier value, a HARQ process number, modulation and coding scheme (MCS) bits, a new data indicator (NDI) bit, and a redundancy version bits. Of course, the PDCCH control signal 120 may include other control signal information, such as specified in the 3GPP LTE technical specification TS 36.212 entitled "Multiplexing and Channel Coding."

In selected embodiments, the codeword identifier is provided by including an additional bit in the format 1A PDCCH control signal 120, in which case the retransmit resource allocation field corresponds to the resource block assignment field specified in the current 3GPP LTE technical specification TS 36.212 v8.3.0 entitled "Multiplexing and Channel Coding" (May 2008). The resource block assignment field in the current DCI format 1A uses $\lceil \log_2(N_{RB}^{DL}(N_{RB}^{DL}+1)/2) \rceil$ bits to provide the downlink resource allocation information, including for resource allocations of type 2, the resource indication value (RIV) corresponding to a starting resource block ($RB_{start}$) and a length in terms of contiguously allocated resource blocks ($L_{CRBs}$). By expanding the format 1A PDCCH control signal to include an additional codeword identifier bit, the UE is able to detect which codeword from the previously transmitted, spatially multiplexed codewords is being retransmitted. However, this additional bit of information increases the control overhead, and also may require changes to the formatting requirements for control signaling with other DCI formats in order to create conformance between the various formats.

In other embodiments, the codeword identifier is provided by taking a bit from the resource block assignment field in the PDCCH control signal to convey the codeword identifier, and then using the remainder of the resource block assignment field as a retransmit resource allocation field in the format 1A PDCCH control signal 120. This is possible because the MCS levels 29-31 are used to indicate a 4-QAM, 16-QAM and 64-QAM modulation level for use in receiving the associated PDSCH data transmission, but are also reserved for transmissions where the transport block size (TBS) is assumed to be the same as that of the previous grant for that transport block. A receiver processes the HARQ process id bits and the NDI bit to detect that the PDCCH control signal is for the retransmission of a codeword. And by processing the MCS bits to detect MCS index values 29-31, the receiver determines that the TBS is the same as the DCI transported in the latest PDCCH for the same codeword. In this case, the receiver retrieves the TBS values from the previous grant from memory, and the codeword identifier is used to select the TBS value corresponding to the identified codeword. The selected TBS value is used to perform a reverse table lookup in a transport block size table to find a plurality of time-frequency resource allocations ($I_{TBS}$, $N_{PRB}$) associated with the retrieved TBS value. Thus, the MCS levels 29-31 and codeword identifier from the PDCCH control signal 120 effectively convey the TBS value and modulation level to the UE, thereby implying that only a subset of all the possible time-frequency resources are possible to be assigned to the user. The retransmit resource allocation field may then be used to choose a time-frequency resource allocation from the plurality of time-frequency resource allocations for use in receiving the re-transmitted codeword. Since there at most $2^{\lceil log_2(N_{RB}^{DL}(N_{RB}^{DL}+1)/2) \rceil - 1}$ time-frequency resource allocations corresponding to any given TBS value, at most $\lceil log_2(N_{RB}^{DL}(N_{RB}^{DL}+1)/2) \rceil - 1$ bits from the RIV bits are required to indicate the time-frequency resource assignment to the user. If a single bit is used provide the codeword identifier, then the retransmit resource allocation field can use up to $\lceil log_2(N_{RB}^{DL}(N_{RB}^{DL}+1)/2) \rceil - 1$ bits to choose from the plurality of time-frequency resource allocations. Clearly, only a part of the retransmit resource allocation field may be needed to choose the time-frequency resource allocation, and the remainder of the retransmit resource allocation field can be used to convey other control information.

Figure 3:
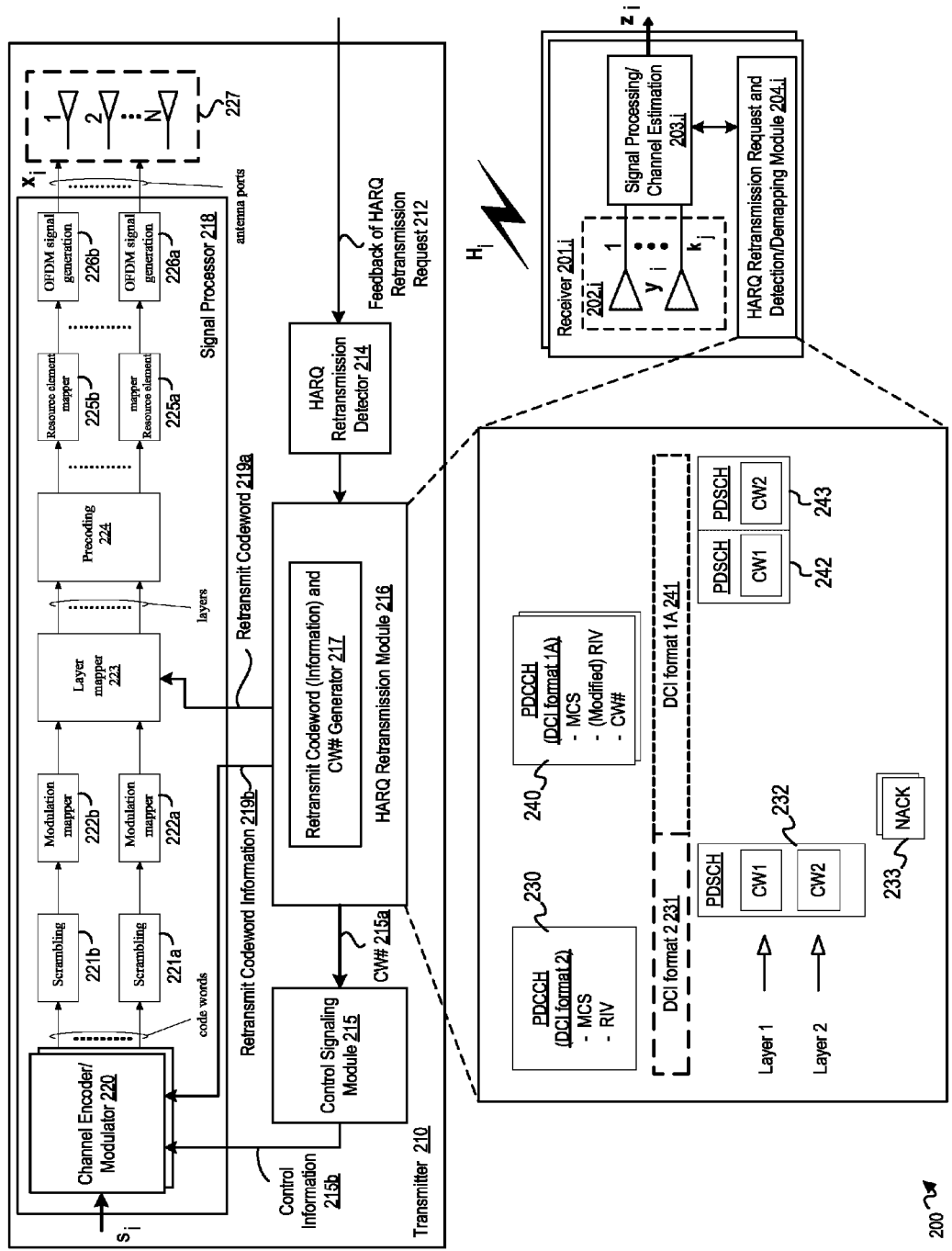
FIG. 3 depicts a wireless communication system in which codeword retransmission is signaled by providing a retransmit control signal which includes a codeword identifier.

FIG. 3 depicts a wireless communication system 300 in which codeword retransmission is signaled by providing a retransmit control signal 240 which includes a codeword identifier. In the depicted system 200, a transmitter 210 uses codebook-based techniques to design downlink precoding vectors for precoding one or more input signals that are transmitted from a transmitter 210 (e.g., a base station) to one or more receivers 201.i (e.g., subscriber stations). The transmitter 210 includes a multi-antenna array 227 for communicating with the receivers 201.i, each of which includes an array 202.i having one or more antennas for communicating with the transmitter 210. In operation, a data signals $s_i$ presented at the transmitter 210 for transmission to the receiver 201.i is transformed by the signal processor 218 into a transmission signal represented by the vector $x_i$. In accordance with the general LTE structure for downlink physical channels, signal processor 218 defines a baseband signal x, from the input data signal $s_i$ by first using an encoder/modulator 220 to perform channel encoding and modulation on the data signals $s_i$, thereby generating one or more codewords. Scrambling unit modules 221a, 221b are then used to scramble coded bits in each of the codewords to be transmitted on a physical channel, and then modulation mapping unit modules 222a, 222b are used to modulate the scrambled bits to generate complex-valued modulation symbols for each codeword. Next, a layer mapper unit module 223 maps the complex-valued modulation symbols for each of the codewords onto one or several layers, followed by a precoding unit module 224 which precodes the complex-valued modulation symbols on each layer for transmission on the antenna ports by mapping the transmission layer(s) onto resources on each of a plurality of transmit antenna ports. Resource element mapper modules 225a, 225b are then used to map the complex-valued modulation symbols for each antenna port to resource elements, and orthogonal frequency division multiplex (OFDM) unit modules 226a, 226b are used to generate complex-valued time-domain OFDM signal for each antenna port.

According to the 3GPP LTE technical specification TS 36.211 entitled "Physical Channels and Modulation," the layer mapper unit module 223 in the transmitter 210 implements a predetermined codeword-to-mapping structure for mapping up to two codewords on up to four transmission layers, depending on the transmission rank. For example, two codewords (CW1, CW2) may be mapped to two or more layers (e.g., Layer 1 and Layer 2) in a PDSCH data transmission 232 sent with a higher rank transmission structure 231 (e.g., DCI format 2 or 2A) under control of a PDCCH control signal 230 which includes at least modulation and coding scheme (MCS) bits and resource indication value (RIV) fields. However, if the transmitter 210 switches to a lower rank transmission structure 241 (e.g., DCI format 1A), only one codeword at a time can be mapped to a single transmission layer (e.g., Layer 1) in a PDSCH data transmission 242, 243. This difference in codeword throughput can create control signaling problems in the PDCCH control signal 240 when two spatially multiplexed codewords need to be re-transmitted to the receiver over a lower rank transmission structure, and the receiver 201.i needs to know which codeword is being re-transmitted.

An example of a codeword re-transmission scenario can arise when one or more of the transmitted codewords will not successfully pass or transmit to the receiver. As is known in the art, there are a variety of error control techniques which may be used to detect and/or correct transmission errors, or to otherwise determine that a transmission has failed. For example, Automatic Repeat-reQuest (ARQ) is an error control method for data transmission which uses acknowledgments and timeouts to achieve reliable data transmission. Another error control method is Hybrid Automatic Repeat-reQuest (HARQ) which adds error-detection (ED) bits to data to be transmitted (such as cyclic redundancy check, CRC), and also adds forward error correction (FEC) bits to the existing Error Detection (ED) bits (such as Reed-Solomon code or Turbo code). If the channel quality is bad and not all transmission errors can be corrected, the receiver will detect this situation using the error-detection code, and a retransmission is requested by the receiver.

While codeword failures can be remedied by retransmitting the failed codeword, there are situations where the control signaling 240 for the retransmission of a codeword over a lower rank transmission structure (e.g., DCI format 1A) needs to identify the codeword being re-transmitted. To consider an example where a HARQ retransmission request requires a codeword identifier for the retransmitted codeword, consider the case where two codewords CW1, CW2 are simultaneously transmitted using a higher order rank transmission structure (e.g., DCI formats 2 or 2A). If the first codeword (e.g., CW1) passes but the second codeword (e.g., CW2) fails, a HARQ retransmission request 212 will be sent to the transmitter 210, requesting that the second codeword CW2 be retransmitted. However, during retransmission of the failed codeword, the control signaling 240 for the retransmitted codeword needs to identify which of the two codewords is being retransmitted. The same is true for situations where there is a transmission failure for both of the originally transmitted codewords. Unfortunately, the control signaling process structure for the DCI format 1A does not include a codeword identifier for the retransmitted codeword, so there is no way to determine which codeword is being retransmitted.

To address this deficiency, a codeword retransmission scheme is now described whereby a retransmit control signal identifies the codeword being retransmitted. In selected embodiments, one extra bit of information is included in the control signaling 240 for the retransmitted codeword to indicate which of the two codewords is being retransmitted. In these embodiments, the PDCCH control signal 240 includes an extra codeword number (CW#) signaling bit to identify the retransmitted codeword, along with at least the MCS bits and the resource indication value (RIV) field. In other embodiments, this deficiency is addressed by re-using existing control signal information in a way that can be recognized by the subscriber station/receiver to identify the retransmitted codeword. In these embodiments, the PDCCH control signal 240 includes at least a codeword number (CW#) to identify the retransmitted codeword, MCS bits, and a modified resource indication value (RIV) field.

In either case, each receiver 201.i includes a HARQ reception module 204.i which provides one or more receiver functions, including detecting and/or correcting errors, detecting codeword transmission failures (e.g., using HARQ error detection techniques), requesting retransmission of the failed codeword(s), detecting and demapping retransmitted codewords and newly transmitted codewords. In addition, the HARQ reception module 204.i may be implemented as part of the signal processor 203.i or with separate control logic and/or circuit functionality at the receiver 201.i to effectively request, detect and identify retransmitted codewords in any desired way. For example, the HARQ reception module 204.i may include circuitry and/or control logic which is used to process the predetermined bit fields (e.g., codeword number, MCS bits, hybrid ARQ process number and the retransmission sequence number in the scheduling assignment fields of the PDCCH control signal 240 or other alternate bits in case of different signaling mechanism) to detect if a particular transmission is a retransmission event, to identify which codeword is being retransmitted, and to subsequently proceed to decode the retransmitted codeword.

At the transmitter 210, a retransmission request generated by a receiver 201.i is detected, such as by using a HARQ retransmission detector 214. Such a detector may be implemented as part of the signal processor 218 or with separate control logic and/or circuit functionality at the transmitter 210 to detect the feedback of a HARQ retransmission request 212 from a receiver 201.i. In response to detecting a HARQ retransmission request for a failed codeword, a HARQ retransmission module 216 at the transmitter 210 includes a module 217 for generating retransmit codeword (information) and an associated codeword identifier (CW#) for the codeword to be retransmitted. As will be appreciated, the generator module 217 may be implemented as part of the signal processor 218 or with separate control logic and/or circuit functionality at the transmitter 210 to generate the failed codeword and the codeword identifier (CW#) n any desired way. For example, the generator module 217 may provide the failed codeword 219a directly to the layer mapper unit module 223 for transmission on the single codeword pipe using DCI format 1A, or may duplicate the information bits from the failed codeword (e.g., CW2), but use different modulation and coding. In these embodiments, the duplicated codeword information 219b to be retransmitted may be provided directly to the encoder/modulator 220. However duplicated, the HARQ retransmission module 216 is configured to duplicate and retransmit at least the information bits in the failed codeword over the single codeword pipe when the transmitter 210 has switched to DCI format 1A.

To alert the receiver 201.i as to which retransmission mode is being used to retransmit which failed codeword, the transmitter 210 includes a control signal module 215 for generating control signaling. Whenever codeword retransmission is scheduled to occur, the control signal module 215 receives codeword retransmission information 215a from the HARQ transmission module 216, including a codeword identifier (CW#) 215a that is generated by the generator module 217 and that is associated with the retransmitted codeword. In response thereto, the control signal module 215 generates control information 215b for baseband processing by the processor 218. As will be appreciated, the control signal module 215 may be implemented as part of the signal processor 218 or with separate control logic and/or circuit functionality at the transmitter 210 to generate a control signal that identifies the selected retransmission mode and the retransmitted codeword, and otherwise tracks any HARQ processing information. In various embodiments, the control signal may be included as one or more parameters in the PDCCH 240, such as the codeword identifier (CW#), the MCS bits and other downlink scheduling assignment information, such as all or part of the resource block assignment information specified in the process structure for DCI format 1A. In this example, the codeword identifier (CW#) identifies which codeword is being retransmitted, the HARQ process ID number field identifies which HARQ process is being retransmitted, and the MCS bits and other downlink scheduling assignment information identify the modulation and coding scheme and allocated time-frequency resource for the retransmit downlink grant.

Any desired control signal parameters may be used to convey the codeword identifier (CW#), HARQ process ID number and downlink scheduling assignment information to the receiver, or to convey other error control process parameters for use in control signaling of codeword transmission or HARQ retransmission specified herein. However, in selected embodiments, the codeword identifier is signaled in the retransmit PDCCH control signal 240 by including one or more additional signaling bits in the control signal generated by the control signal module 215. At the receiver 201.i, the additional signaling bits are detected in the reception module 204.i and used to determine which codeword is being retransmitted. To provide an example where two originally transmitted codewords are identified by a single additional control signal bit, a first failed codeword is signaled when the signaling bit has a first predetermined value, but a second failed codeword is signaled when the signaling bit has a second predetermined value. By using one or more additional signaling bits to signal which codeword is being retransmitted, it is possible to use the current control signal bits for DCI format 1A for their currently defined control signaling purposes.

In other embodiments, the codeword identifier is signaled in the retransmit PDCCH control signal 240 by re-using existing control signal bits in a way that can be recognized by the subscriber station/receiver, thereby freeing one of the control bits for use as a codeword identifier. In such embodiments, the codeword identification bit is extracted from the RIV field using current properties of the specification related to MCS 29-31 so that no additional bits are added to the DCI format 1A, nor is scheduling flexibility reduced. At the receiver 201.i, the reception module 204.i may be configured to determine the transport block size (TBS) for the retransmitted codeword from the MCS levels 29-31 and the codeword identification bit, and then use the modified RIV field to select from the time-frequency resource allocations corresponding to the TBS. This may be done by including control logic and/or circuitry in the reception module 204.i that detects a retransmission event from the MCS levels 29-31 in the PDCCH control signal 240, and then uses the modified RIV field to choose the time-frequency resource allocation for the identified codeword.

Figure 4:
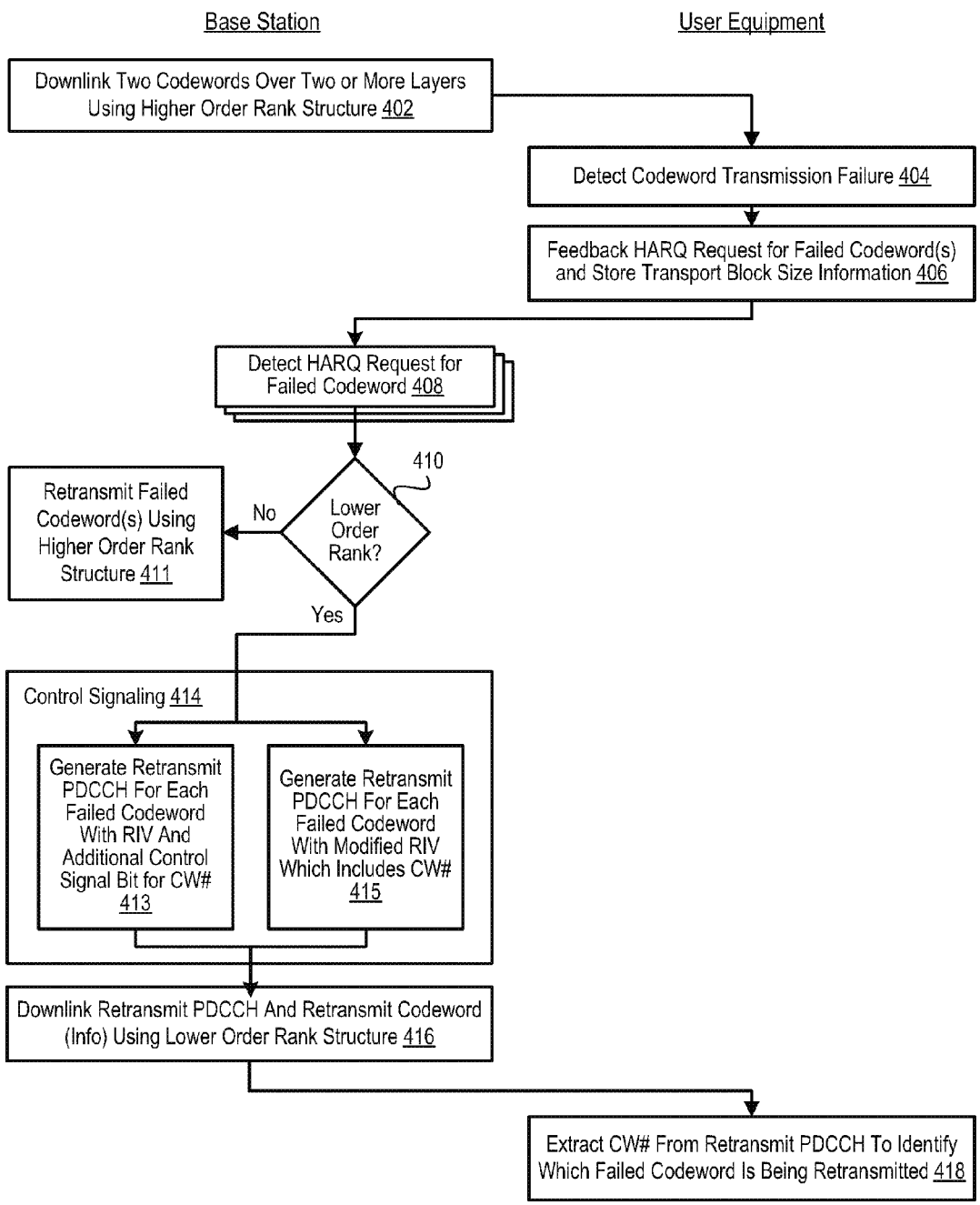
FIG. 4 depicts a first example flow for a retransmission methodology for retransmitting failed codewords over a single codeword pipe using a retransmit control signal which includes a codeword identifier.

FIG. 4 depicts a first example flow for a retransmission methodology 400 for retransmitting failed codewords over a single codeword pipe using a retransmit control signal which includes a codeword identifier. As a preliminary step, a transmitter/base station transmits two codewords over two or more transmission layers to a receiver/user equipment using a higher order rank transmission structure (step 402). In an example embodiment, the higher order rank transmission structure is set up with downlink control information having DCI formats 2 or 2 which are used to grant downlink MIMO transmissions. At the receiver/user equipment, a codeword transmission failure is detected (step 404), such as by implementing a HARQ error control scheme at the user equipment. To request retransmission of the failed codeword, the receiver/user equipment feeds back a HARQ retransmission request for the failed codeword (step 406). In addition, the receiver/user equipment stores the transport block size information for each of the codewords (step 406). The TBS values are stored using an addressing or indexing scheme so that the TBS for each codeword can be retrieved from storage using a predetermined codeword identifier value.

At the base station, one or more HARQ retransmission requests are detected (step 408), where each HARQ retransmission request may be fed back by a different user equipment device. If the rank transmission structure for the transmitter/base station has not switched to a lower rank which would allow only a single codeword to be retransmitted at a time (negative outcome to decision 410), then the failed codewords may be retransmitted together (step 411) using an appropriate higher order rank structure if supported by the channel conditions. However, the rank transmission structure has switched to a lower rank which would allow only a single codeword to be retransmitted at a time (affirmative outcome to decision 410), then at least information bits from the failed codewords must be re-transmitted under control of a downlink control signal (step 414). In selected embodiments, the base station generates and sends control signaling in the form of a retransmit PDCCH control signal for each failed codeword which includes an extra control signal bit CW# for identifying the codeword (step 413) to notify the user equipment of which failed codeword is being retransmitted. In this case, the retransmit PDCCH control signal 413 also includes the MCS and RIV bits to indicate the modulation and coding schemes and the time-frequency resource that is allocated for the grant. In other embodiments, the base station generates and sends a retransmit PDCCH control signal which includes MCS bits and a redefined RIV field which includes a control signal bit CW# for identifying the codeword (step 415) to notify the user equipment of which failed codeword is being retransmitted. In this case, the redefined RIV field also includes one or more selection bits for indicating the time-frequency resource assignment that is allocated for the grant to the receiver/user equipment.

Once the retransmit control signaling and codewords are generated at the base station, they are sent over a downlink channel using the lower order rank structure (step 416) as a retransmit PDCCH control signal and retransmit PDSCH data transmission, respectively. At the user equipment, control logic may be configured to detect the retransmitted control signal and codeword (step 418), including extracting the codeword identifier CW# from the retransmit PDCCH to identify which failed codeword is being retransmitted.

Figure 5:
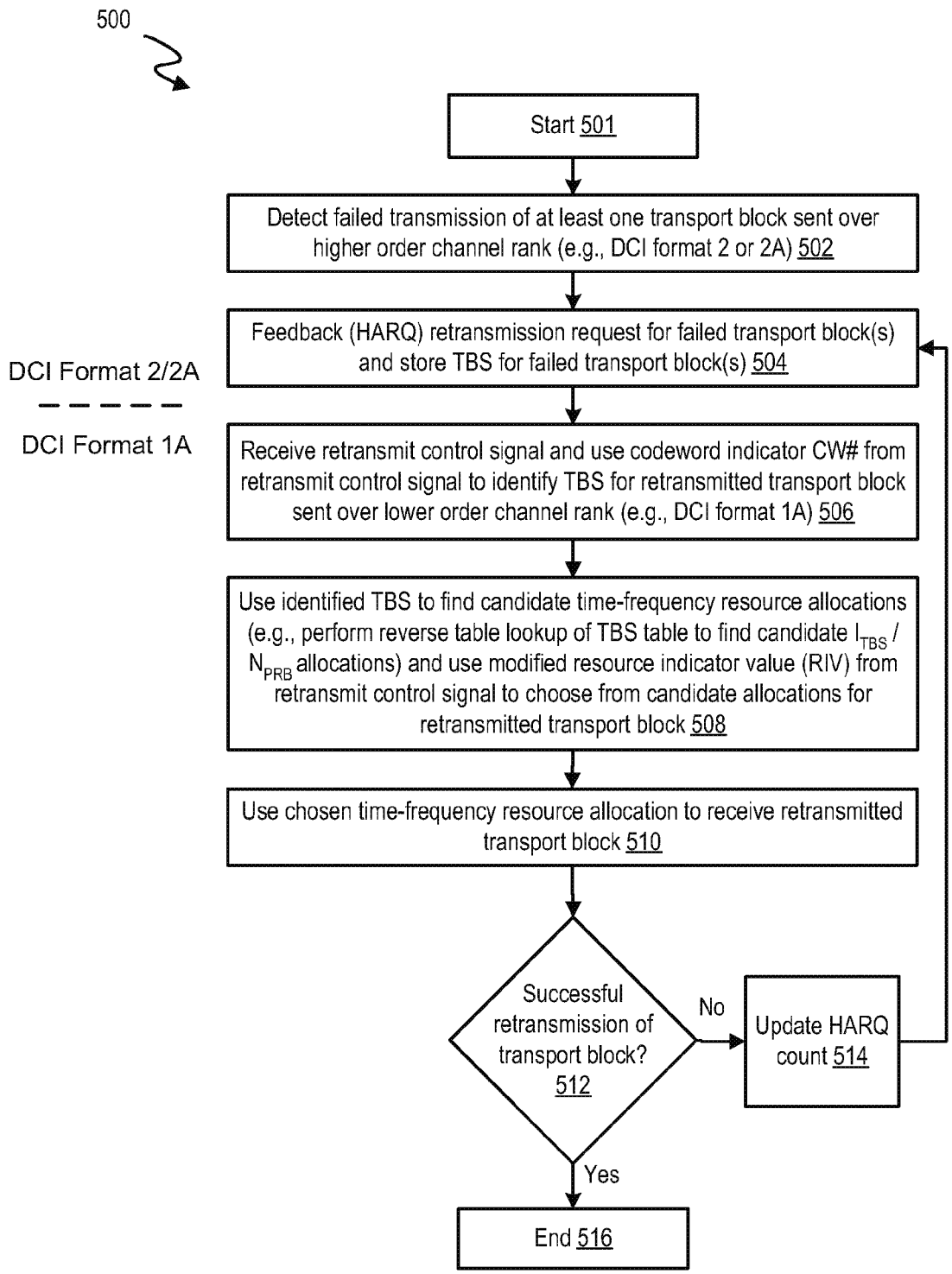
FIG. 5 depicts an example flow for a receiver which processes a HARQ retransmission sent over a lower order channel.

The use of the codeword identifier CW# at the receiver/user equipment is described now with reference to FIG. 5 which depicts an example flow 500 for processing a HARQ retransmission sent over a lower order channel to a receiver. As depicted, the process starts (step 501) when the transmitter simultaneously transmits two transport blocks or codewords over at least two transmission layers using a higher order channel rank. To prepare the receiver to receive the codewords, the transmitter sends a DCI grant in a PDCCH control signal using DCI format 2 which includes MCS bits to indicate the modulation and coding scheme to be used, along with the resource indicator bits to indicate the transport block size and the time-frequency resource allocated for the grant. For example, the resource indicator bits are used to indicate the time-frequency resource allocated for the grant according to Table 7.1.7.2.1-1 in the E-UTRA air interface specification at 3GPP TS 36.213 (V8.3.0). By using a higher order channel rank to transmit the two codewords, the transmitter spatially multiplexes the two codewords as independent and separately encoded data signals or streams.

At step 502, the receiver detects the failed transmission of at least one of the transport blocks sent over the higher order channel rank. As will be appreciated, any desired error control technique may be used to detect and/or correct transmission errors, or to otherwise determine that a transmission has failed, including but not limited to the ARQ or HARQ error control methods. And at step 504, the receiver feeds back a retransmission request for any failed transport blocks that were not successfully transmitted. If, for example, the two transport blocks (CW1 and CW2) were originally transmitted (at step 501) using a channel rank whereby a first transport block (CW1) was mapped to layer 0 and the second transport block (CW2) was mapped to layer 1, channel conditions may cause the second transport block (CW2) to fail transmission while the first transport block (CW1) passes. In another example, both transport blocks may fail transmission. As will be appreciated, transmission failure can be caused by any of a variety of reasons, such as poor channel transmission or noise conditions. The retransmission request may be generated by a receiver as a HARQ retransmission request when the receiver's HARQ error control module determines that the transmission of one or more of the transport blocks failed, though other error control methodologies may be used to generate retransmission requests. When a HARQ retransmission request is generated and fed back to the transmitter, the receiver and transmitter both maintain error control processing parameters (e.g., HARQ process ID number and retransmission count) for the retransmission request.

At step 506, the transmitter has switched to a lower order channel rank so that a retransmit control signal is sent over the lower order channel rank (e.g., DCI format 1A) where it is received and processed by the receiver. The receiver extracts the codeword indicator value CW# from retransmit control signal to identify the TBS value for the retransmitted transport block. This may be done at the receiver by using the codeword indicator to select from the TBS values from the originally transmitted transport blocks that were previously stored by the receiver. In an example embodiment, the codeword indicator is the first bit in the retransmit control signal, and is used to determine which transport block is being transmitted, and to identify which of the stored transport block size values correspond to the retransmitted transport block.

At step 508, the receiver uses the identified TBS value to find candidate time-frequency resource allocations that correspond to the identified TBS value, and then uses the modified resource indicator value (RIV) from the retransmit control signal to choose from candidate allocations for retransmitted transport block. In an example implementation, the identified TBS value is used to perform a reverse table lookup of the transport block size table 7.1.7.2.1-1 in the E-UTRA air interface specification at 3GPP TS 36.213 to find candidate $I_{TBS}/N_{PRB}$ allocations. As an example, an excerpt from the transport block size table is set forth below:

TABLE 7.1.7.2.1-1

Transport block size table (excerpt)

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 200 | 232 | 248 |
| 1 | 24 | 48 | 88 | 120 | 160 | 200 | 232 | 272 | 304 | 344 |
| 2 | 32 | 72 | 120 | 160 | 200 | 248 | 296 | 336 | 376 | 424 |
| 3 | 40 | 104 | 152 | 208 | 272 | 320 | 392 | 440 | 504 | 568 |
| 4 | 48 | 120 | 200 | 264 | 320 | 408 | 488 | 552 | 632 | 696 |
| 5 | 72 | 152 | 232 | 320 | 424 | 504 | 600 | 680 | 776 | 872 |
| 6 | 320 | 176 | 288 | 392 | 504 | 600 | 712 | 808 | 936 | 1032 |

If the TBS size for the first transport block identified by the codeword indicator value is "200," then this implies that, for the retransmission of the first transport block, only four time-frequency resource allocations are possible, namely (0, 8), (1, 6), (5, 2), and (3, 4). As a result, only two bits are required from the modified RIV to choose from the candidate allocations for the first transport block, and the rest are available for other uses. As will be appreciated, the selection bits may implement a predetermined selection rule so that the selection bit values 00 choose the first candidate time-frequency resource allocation in the table listing from left to right (or top to bottom), the selection bit values 01 choose the second candidate time-frequency resource allocation in the table listing from left to right (or top to bottom), the selection bit values 10 choose the third candidate time-frequency resource allocation in the table listing from left to right (or top to bottom), and the selection bit values 11 choose the fourth candidate time-frequency resource allocation in the table listing from left to right (or top to bottom). Thus, the selection bits may implement a choice rule by row or by column in the transport block size table, though other selection algorithms may be used. Even in the worst case scenario, there is at least one squeezed bit available from the modified RIV to provide a codeword indication, though the squeezed bit(s) may be used to perform any desired control signaling function. For example, the squeezed bit(s) can be used to provide additional power control information, to expand the size of the HARQ process ids, or any other predetermined control information.

At step 510, the receiver uses the chosen time-frequency resource allocation in combination with the modulation and coding scheme specified by the MCS bits to receive and decode the retransmitted transport block. If the failed codeword is not successfully transmitted (negative outcome to decision 512), then the error control parameters (e.g., HARQ count) are updated (step 514), and another retransmission request is processed (as indicated by the feedback loop to step 504). However, if the failed codeword passes (affirmative outcome to decision 512), then the retransmission process ends (step 516).

While the example sequence described with reference to FIG. 5 describes a scenario where one of the transport blocks fails the original transmission, it will be appreciated that the disclosed techniques may also be used when both of the transport blocks fail, in which case the sequence is repeated for the other transport block.

By now it should be appreciated that there has been provided a method, apparatus, and system for (re)transmitting codewords in a MIMO communication system. As disclosed, a plurality of codewords are transmitted to a receiver over at least first and second transmission layers, such as by spatially multiplexing first and second codewords in a MIMO transmission. Subsequently, a request is received from the receiver to retransmit a first codeword from the plurality of codewords. The retransmit request may be received as a Hybrid Automatic Repeat-reQuest (HARD) retransmission request for the first codeword. In response, the transmitter encodes a control channel to signal retransmission of the first codeword over only a single transmission layer by signaling a codeword identifier for the first codeword as part of a resource block assignment field in a downlink control signal. As will be appreciated, the codeword identifier for the first codeword may be signaled by setting a codeword identifier signal value to a first predetermined value. In selected embodiments, the control channel is encoded by generating a physical downlink control channel (PDCCH) retransmit control signal with format 1A downlink control information (DCI) in combination with an additional codeword identifier signal value for the first codeword. As generated, the PDCCH retransmit control signal may include a DCI format 1A modulation and coding scheme field, a DCI format 1A resource block assignment field, and the additional codeword identifier signal value. In other embodiments, the control channel is encoded by generating a PDCCH retransmit control signal which includes format 1A downlink control information in which a first control field signals that the resource block assignment field includes a codeword identifier signal value for the first codeword. In these embodiments, the first control field may include a DCI format 1A MCS field having one or more predetermined values, and the resource block assignment field may include the codeword identifier signal value and a one or more selection bits for indicating a time-frequency resource allocation to be used for retransmitting the first codeword over only the single transmission layer. Finally, the transmitter retransmits the first codeword over the single transmission layer under control of the downlink control signal. As will be appreciated, the foregoing sequence can be repeated to signal retransmission of the second codeword after receiving a request from the receiver to retransmit the second codeword from the plurality of codewords. In this case, a second control channel is encoded to retransmit the second codeword over only a single transmission layer by signaling a second codeword identifier for the second codeword as part of a resource block assignment field in a second downlink control signal by setting a second codeword identifier signal value in the second downlink control signal to a second predetermined value, and then retransmitting the second codeword over only the single transmission layer under control of the second downlink control signal.

In another form, there is provided a method, apparatus, and system for configuring a control channel in a MIMO communication system where there has been a transmission failure for one or more of spatially multiplexed first and second transport blocks. As disclosed, a PDCCH control signal is generated for scheduling retransmission of a selected transport block over a PDSCH. The generated PDCCH control signal includes a modulation and coding scheme field for signaling that the selected transport block has a transport block size specified from a previous PDCCH for the selected transport block. In an example embodiment, the MCS field contains an MCS index value ($I_{MCS}$) such that $29<I_{MCS}<31$. The generated PDCCH control signal also includes a transport block identifier bit for indicating that the selected transport block is the first transport block when the transport block identifier bit has a first value, and for indicating that the selected transport block is the second transport block when the transport block identifier bit has a second value. The generated PDCCH control signal may also include a HARQ process number field and a resource block assignment field, where in selected embodiments, the transport block identifier bit is not included in the resource block assignment field. In other embodiments, the transport block identifier bit is included in the resource block assignment field, in which case the resource block assignment field may also include one or more selection bits for use by a user equipment device in selecting a time-frequency resource allocation from a plurality of time-frequency resource allocations to be used for retransmitting the selected block.

In yet another form, there is provided a method, system and receiver for receiving a retransmission of a transport block in a MIMO communication system. As disclosed, a transmission of spatially multiplexed first and second transport blocks is received under control of a first PDCCH control signal which uses downlink control information (DCI) format 2 or 2A to convey first and second transport block size values for the first and second transport blocks. The first and second transport block size values are stored at the receiver for the first and second transport blocks, and when a transmission failure is detected for at least the first transport block, the receiver sends a request to retransmit the first transport block. Subsequently, a second PDCCH control signal is received in a predetermined DCI format for scheduling retransmission of the first transport block over a single transmission layer. As received, the second PDCCH control signal includes HARQ process id bits, new data indicator (NDI) bits, modulation and coding scheme (MCS) bits, and resource block assignment bits comprising a transport block identifier bit and resource indication bits. The receiver processes the HARQ process id bits and the NDI bits from the second PDCCH control signal to determine that the second PDCCH control signal is scheduling the retransmission of a selected transport block. The receiver also processes the MCS bits and the transport block identifier bit from the second PDCCH control signal to select a transport block size value for the first transport block from the stored first and second transport block size values. The processing of the MCS and transport block identifier bits may be performed by detecting that the selected transport block has a transport block size specified in the first PDCCH control signal when the MCS bits convey an MCS index value ($I_{MCS}$) such that $29 \leq I_{MCS} \leq 31$, and then using the transport block identifier bit to select a transport block size value for the first transport block from the stored first and second transport block size values. In addition, the receiver identifies a plurality of time-frequency resource allocations associated with the selected transport block size value, such as by performing a reverse table lookup operation in a transport blocks size table to retrieve a plurality of $I_{TBS}$ and $N_{PRB}$ pairings which correspond to the selected transport block size value. Finally, the receiver processes the resource indication bits to select a time-frequency resource allocation from the plurality of time-frequency resource allocations for use in receiving the retransmitted first transport block.

In still yet another form, there is provided a method, system, and transmitter for retransmitting a codeword to a receiver in a wireless communication system. As disclosed, at least a first codeword is transmitted by a transmitter under control of a first PDCCH control signal. Subsequently, the transmitter receives a request from the receiver to retransmit the first codeword. In response, the transmitter encodes a second PDCCH control signal to indicate retransmission of the first codeword. As encoded, the second PDCCH control signal includes a first control field and a resource allocation field. The first control field signals that the first codeword being transmitted has a transport block size specified in the first PDCCH control signal. This first control field may be implemented by using and NDI bit and/or MCS bits conveying an MCS index value ($I_{MCS}$) such that $29 \leq I_{MCS} \leq 31$. The resource allocation field includes predetermined control bit(s) and one or more selection bits for use by a receiver in selecting a time-frequency resource allocation from a plurality of time-frequency resource allocations corresponding to the transport block size for the first codeword to be used for retransmitting the first codeword. For example, the resource allocation field may include one or more predetermined control bits and one or more selection bits for selecting a first time-frequency resource allocation from a plurality of time-frequency resource allocations corresponding to the transport block size for the first codeword to be used for retransmitting the first codeword. By virtue of conveying the transport block size with the first control field, the number of selection bits in the resource allocation field can be less than a total number of resource allocation field bits that would be needed to specify the first time-frequency resource allocation if the transport block size had to be signaled in the resource allocation field. As a result, the one or more predetermined control bits and the one or more selection bits both fit in the total number of resource allocation field bits. The predetermined control bits may be a codeword identifier value corresponding to the first codeword being transmitted, but may instead be used for other control signaling purposes. Finally, the transmitter retransmits the first codeword under control of the second PDCCH control signal.

In yet another form, there is provided a method, system and receiver for receiving a retransmission of a transport block in a wireless communication system. As disclosed, a first transport block is received under control of a first physical downlink control channel (PDCCH) control signal which uses downlink control information to convey a first transport block size value for the first transport block. At the receiver, the first transport block size value for the first transport block is stored. When a transmission failure is detected at the receiver for at least the first transport block, a request is then sent to retransmit the first transport block. Subsequently, the receiver receives a second PDCCH control signal for scheduling retransmission of the first transport block over a single transmission layer, where the second PDCCH control signal includes a first control field (for signaling that the first transport block being transmitted has the transport block size specified in the first PDCCH control signal) and a resource allocation field which includes one or more predetermined control bits and one or more selection bits for selecting a first time-frequency resource allocation from a plurality of time-frequency resource allocations corresponding to the first transport block size value. The predetermined control information may be a transport block identifier value corresponding to the first transport block being transmitted, but may instead be used for other control signaling purposes, such as to convey power control information, to expand the size of the HARQ process ids, or any other predetermined control information. The receiver processes at least the first control field from the second PDCCH control signal to determine that the second PDCCH control signal is scheduling a retransmission of the first transport block. In addition, the receiver identifies a plurality of time-frequency resource allocations associated with the first transport block size value, and then processes at least the one or more selection bits to select a time-frequency resource allocation from a plurality of time-frequency resource allocations corresponding to the first transport block size value for use in receiving the retransmitted first transport block.

The methods and systems for retransmitting codewords over a lower order rank structures by providing a codeword indicator in the control signal as shown and described herein may be implemented in software stored on a computer-readable medium and executed as a computer program on a general purpose or special purpose computer to perform certain tasks. For a hardware implementation, the elements used to perform various signal processing steps at the transmitter (e.g., coding and modulating the data, scrambling, mapping, precoding the mapped modulated signals, preconditioning the precoded signals, retransmitting the codewords, and so on) and/or at the receiver (e.g., recovering the transmitted signals, demodulating and decoding the recovered signals, detecting whether transmission succeeded, feeding back retransmission requests, and so on) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various MIMO precoding systems and methods for using same, the present invention is not necessarily limited to the example embodiments illustrate herein. For example, various embodiments of a MIMO precoding system and design methodology disclosed herein may be implemented in connection with various proprietary or wireless communication standards, such as IEEE 802.16e, 3GPP-LTE, DVB and other multi-user MIMO systems. In addition, it will be appreciated that the embodiments described herein with reference to transmitting codewords from a base station to user equipment may be generalized to apply to any transmitter and receiver, or vice versa. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-program storage apparatus comprising a memory having one or more software modules stored thereon, the one or more software modules being executable by one or more processors and the one or more software modules comprising:
    code for receiving a first transport block under control of a first control signal;
    code for storing at least a portion of the first control signal;
    code for detecting a transmission failure for at least the first transport block;
    code for sending a request to retransmit the first transport block;
    code for receiving a second control signal configured to schedule retransmission of the first transport block; and
    code for receiving the retransmitted first transport block based at least in part on the second control signal and the stored at least portion of the first control signal.

2. The apparatus of claim 1, where the second control signal indicates a transport block identifier.

3. The apparatus of claim 2, where reception of the retransmitted first transport block is additionally based on the transport block identifier.

4. The apparatus of claim 1, where the second control signal indicates one or more of: a modulation and coding scheme (MCS), a transport block size, and a time frequency resource allocation.

5. The apparatus of claim 1, where first transport block and the retransmitted transport block differ in transmission channel rank.

6. The apparatus of claim 1, where the retransmission of the first transport block comprises transmission over a single transmission layer.

7. A computer-program storage apparatus comprising a memory having one or more software modules stored thereon, the one or more software modules being executable by one or more processors and the one or more software modules comprising:
   code for transmitting one or more codewords to a receiver over a plurality of transmission layers;
   code for receiving a request from the receiver to retransmit a first codeword from the one or more codewords;
   code for signal retransmission of the first codeword over only a single transmission layer; and
   code for retransmitting the first codeword over only the single transmission layer.

8. The apparatus of claim 7, where the retransmission signal indicates a retransmitted codeword identifier.

9. The apparatus of claim 7, where the retransmission signal comprises an abbreviated set of control information.

10. The apparatus of claim 9, where the abbreviated set of control information is configured to augment previously transmitted control information.

11. The apparatus of claim 9, where the abbreviated set of control information comprises a modulation and coding scheme (MCS).

12. A computer-program storage apparatus for configuring control information in a multiple input-multiple output (MIMO) wireless communication apparatus, where there has been a transmission failure for one or more of spatially multiplexed first and second transport blocks, comprising a memory having one or more software modules stored thereon, the one or more software modules being executable by one or more processors and the one or more software modules comprising:
   code for generating a control signal for scheduling retransmission of a selected transport block, where the control signal comprises:
      a modulation and coding scheme field for signaling that the selected transport block has a transport block size specified from a previous transmission of the selected transport block; and
      a transport block identifier bit for indicating that the selected transport block is the first transport block when the transport block identifier bit has a first value, and for indicating that the selected transport block is the second transport block when the transport block identifier bit has a second value.

13. The apparatus of claim 12, wherein the control signal further comprises a HARQ process number field and a resource block assignment field, where the transport block identifier bit is not included in the resource block assignment field.

14. The apparatus of claim 12, wherein the control signal further comprises a HARQ process number field and a resource block assignment field, where the transport block identifier bit is included in the resource block assignment field.

15. The apparatus of claim 14, where the resource block assignment field further comprises one or more selection bits for use by a user equipment device in selecting a time-frequency resource allocation from a plurality of time-frequency resource allocations to be used for retransmitting the selected block.

16. The apparatus of claim 12, where the modulation and coding scheme field comprises a modulation and coding scheme index value ($I_{MCS}$) such that $29 < I_{MCS} < 31$.

* * * * *

UNITED STATES PATENT AND TRADEMARK OFFICE
CERTIFICATE OF CORRECTION

| | | |
|---|---|---|
| PATENT NO. | : 9,043,666 B2 | Page 1 of 1 |
| APPLICATION NO. | : 14/270376 | |
| DATED | : May 6, 2014 | |
| INVENTOR(S) | : Kotecha et al. | |

It is certified that error appears in the above-identified patent and that said Letters Patent is hereby corrected as shown below:

In the Claims:

Claim 7, Column 19, Line 20, delete "signal" and insert -- signaling --

Signed and Sealed this
Twenty-seventh Day of October, 2015

Michelle K. Lee
*Director of the United States Patent and Trademark Office*